United States Patent [19]

Ackroyd

[11] Patent Number: 5,341,987
[45] Date of Patent: Aug. 30, 1994

[54] TEMPERATURE CONTROL FLOW VALVE

[75] Inventor: Rand H. Ackroyd, Methuen, Mass.

[73] Assignee: Watts Investment Company, Wilmington, Del.

[21] Appl. No.: 973,265

[22] Filed: Nov. 9, 1992

[51] Int. Cl.$^5$ .............................. G05D 23/13
[52] U.S. Cl. .................................. 236/12.21
[58] Field of Search ................ 236/12.21; 137/98

[56] References Cited

U.S. PATENT DOCUMENTS

| | | | |
|---|---|---|---|
| 1,877,510 | 9/1932 | Hughes | 236/93 B |
| 2,200,578 | 5/1940 | Mahon | 137/98 |
| 2,214,375 | 9/1940 | Jackson | 137/139 |
| 3,032,058 | 5/1962 | Weese | 137/468 |
| 3,116,748 | 1/1964 | Wasson | 137/98 |
| 3,436,017 | 4/1969 | Elmer | 236/92 |
| 3,921,659 | 11/1975 | Rudewick, III | 137/98 |
| 3,938,741 | 2/1976 | Allison | 239/75 |
| 4,210,284 | 7/1980 | Tarnay et al. | 239/75 |
| 4,563,780 | 1/1986 | Pollack | 4/192 |
| 4,778,104 | 10/1988 | Fisher | 236/80 R |
| 4,896,658 | 1/1990 | Yonekubo et al. | 126/362 |
| 4,896,691 | 1/1990 | Green et al. | 137/100 |
| 4,905,732 | 3/1990 | Bright et al. | 137/605 |
| 4,915,295 | 4/1990 | Pullen et al. | 236/12.16 |
| 5,161,737 | 11/1992 | Olmsted et al. | 236/12.21 |

Primary Examiner—William E. Tapolcai
Attorney, Agent, or Firm—Fish & Richardson

[57] ABSTRACT

A temperature control flow valve has a body defining conduits for connection to sources of cold and hot water, a chamber for mixing the water, and a thermostat element for maintaining the temperature of the mixed water at or below a predetermined maximum temperature. The cold and hot water are combined through a mixing valve in a ratio adjusted continuously by means of the thermostat element to provide the mixed water at the predetermined temperature. The flow valve includes cold water and hot water pressure regulators responsive to the ratio of cold water to hot water pressures to substantially balance the pressure of the hot water and the pressure of the cold water delivered through the regulator.

21 Claims, 2 Drawing Sheets

5,341,987

TEMPERATURE CONTROL FLOW VALVE

BACKGROUND OF THE INVENTION

The invention relates to fluid flow control valves, and in particular to valves adapted to maintain the temperature of fluid delivered through the valve below a predetermined maximum level.

Temperature control or anti-scald valves are employed for regulating the temperature of water delivered to a faucet or the like, e.g., in a facility such as a nursing home, school or hotel, to ensure that the water is at or below a predetermined maximum temperature to reduce the potential for injury. The anti-scald valve may be connected to the hot and cold water supply lines to regulate flow in order to provide a temperature-controlled mixture.

SUMMARY OF THE INVENTION

According to one aspect of the invention, a temperature control flow valve comprises a body defining a first conduit having a cold water inlet for attachment to a source of cold water, a second conduit having a hot water inlet for attachment to a source of hot water, at least a first mixing chamber, the first conduit having a cold water outlet for flow of cold water into the first mixing chamber, and the second conduit having a hot water outlet for flow of hot water into the first mixing chamber, and a mixed water outlet for attachment to a conduit system for delivery of mixed water to one or more points of use; a cold water pressure regulator to control the pressure of cold water flowing toward the cold water outlet, the cold water pressure regulator comprising a cold water valve element disposed for movement relative to an opposed cold water valve seat in a manner to regulate the flow of cold water through a cold water valve opening; a hot water pressure regulator to control the pressure of hot water flowing toward the hot water outlet, the hot water pressure regulator comprising a hot water valve element disposed for movement relative to an opposed hot water valve seat in a manner to regulate the flow of hot water through a hot water valve opening, means for balancing the pressure of hot water flowing toward the hot water outlet with the pressure of cold water flowing toward the cold water outlet, a mixing valve assembly comprising a mixing valve element disposed in the first mixing chamber, the mixing valve element adapted for movement within the first mixing chamber in a manner to adjust the ratio of hot water and cold water flowing into the first mixing chamber, and a thermostat element connected with the mixing valve element, the thermostat element adapted to react to change of temperature of the mixed water in a manner to adjust the position of the mixing valve element in the first mixing chamber, thereby to maintain the temperature of mixed water below a predetermined maximum temperature.

Preferred embodiments of this aspect of the invention may include one or more of the following additional features. The body further defines a second mixing chamber and at least a third conduit connecting the first and second mixing chambers, the outlet being connected to the second mixing chamber and the thermostat element being disposed in the second mixing chamber. Preferably, the body defines one or more additional conduits also connecting the first and second mixing chambers. The body further defines a further cold water outlet adapted for attachment to a conduit system for delivery of cold water to one or more points of use. The means for balancing the pressure of hot water flowing toward the hot water outlet with the pressure of cold water flowing toward the cold water outlet comprises: a moveable element disposed in a chamber defined by the body, a first surface of the moveable element in contact with the cold water conduit, and a second, opposite surface of the moveable element in contact with the hot water conduit, and means connecting the moveable element with the hot water and cold water valve elements, the moveable element adapted to move in reaction to variation in a ratio of pressure in the cold water conduit to pressure in the hot water conduit, movement of the moveable element resulting in movement of the hot water valve element relative to the hot water valve seat and in movement of the cold water valve element relative to the cold water valve seat. Preferably, the moveable element comprises a diaphragm. The mixing valve assembly further comprises first and second mixing valve seats, and the mixing valve element disposed in the first mixing chamber comprises a first mixing valve member opposed to and disposed for engagement upon the first mixing valve seat and a second mixing valve member opposed to and disposed for engagement upon the second mixing valve seat, and the first mixing valve member and the opposed first mixing valve seat together defining a cold water flow orifice and the second mixing valve member and the opposed second mixing valve seat defining a hot water flow orifice. The thermostat element comprises at least one cell containing a material (e.g. wax containing heat-conducting particles) adapted to change volume in reaction to change of temperature. Preferably, the thermostat element comprises a redundancy of cells. The temperature control flow valve further comprises means for biasing the cold water valve element toward the cold water valve seat. The cold water valve element further comprises a cold water piston element defining a surface exposed to cold water supply pressure acting in a first direction, and the hot water valve element further comprises a hot water piston element defining a surface exposed to hot water supply pressure acting in a second direction generally opposed to the first direction. The temperature control flow valve further comprises check valve means disposed in the cold water outlet and, preferably, also in the hot water outlet.

According to another aspect of the invention, a pressure control flow valve comprises: a body defining a first conduit having a cold water inlet adapted for attachment to a source of cold water and a cold water outlet, a second conduit having a hot water inlet adapted for attachment to a source of hot water and a hot water outlet; a cold water pressure regulator adapted to control the pressure of cold water flowing toward the cold water outlet, the cold water pressure regulator comprising a cold water valve element disposed for movement relative to an opposed cold water valve seat in a manner to regulate the flow of cold water through a cold water valve opening; a hot water pressure regulator adapted to control the pressure of hot water flowing toward the hot water outlet, the hot water pressure regulator comprising a hot water valve element disposed for movement relative to an opposed hot water valve seat in a manner to regulate the flow of hot water through a hot water valve opening; means for balancing the pressure of hot water flowing toward the hot water outlet with the pressure of cold water flowing toward the cold water outlet, the means for balancing comprising a moveable element disposed in a chamber defined by the body, a first surface of the moveable element in contact with the cold water conduit, and a second, opposite surface of the moveable element in contact with the hot water conduit, and means connecting the moveable element with the hot water valve element and with the cold water valve element, the moveable element adapted to move in reaction to variation in a ratio of pressure in the cold water conduit to pressure in the hot water conduit, movement of the moveable element resulting in movement of the hot water valve element relative to the hot water valve seat and in movement of the cold water valve element relative to the cold water valve seat, whereby the pressure of cold water delivered at the cold water outlet and the pressure of hot water delivered at the hot water outlet are substantially balanced.

Preferred embodiments of this aspect of the invention may include one or more of the following additional features. The moveable element comprises a diaphragm. The temperature control flow valve further comprises means for biasing the cold water valve toward the cold water valve seat. The cold water valve element further comprises a cold water piston element defining a surface exposed to cold water supply pressure acting in a first direction, and the hot water valve element further comprises a hot water piston element defining a surface exposed to hot water supply pressure acting in a second direction generally opposed to the first direction. The temperature control flow valve further comprises check valve means disposed in the cold water outlet and, preferably, also in the hot water outlet.

Thus there is provided a temperature control flow valve in which the control of temperature is assisted by balance of cold water and hot water supply pressures. The pressure and temperature controls are combined in a single unit to prevent mis-adjustment that might result in delivery of water at scalding temperatures. The valve of the invention is adapted for installation adjacent a source of hot water, e.g. at the hot water heater in a home or in a complex of apartments, for delivery of mixed (hot) water at a predetermined maximum temperature[1] to all of the points of use within the facility to be served. Furthermore, if flow of cold water to the valve is interrupted, the valve will cease all flow to prevent unmixed hot water at a temperature above the predetermined maximum from reaching the point of use. In an alternate embodiment, cold water flow to mixing valves at the points of use is also delivered through the valve of the invention, so that loss of the source of cold water flow required for lowering the temperature of water at the point of use will result in discontinuation of flow of the mixed (hot) water as well. Finally, the valve of the invention also provides the cold water and the hot water at substantially balanced pressure.

[1] The temperature of the mixed water will, of course, fall below the predetermined maximum temperature if the temperature of water from the hot water source is below the expected level.

Other features and advantages of the invention will become apparent from the following description of a presently preferred embodiment, and from the claims.

DESCRIPTION OF THE ILLUSTRATED EMBODIMENT

Figure 1:
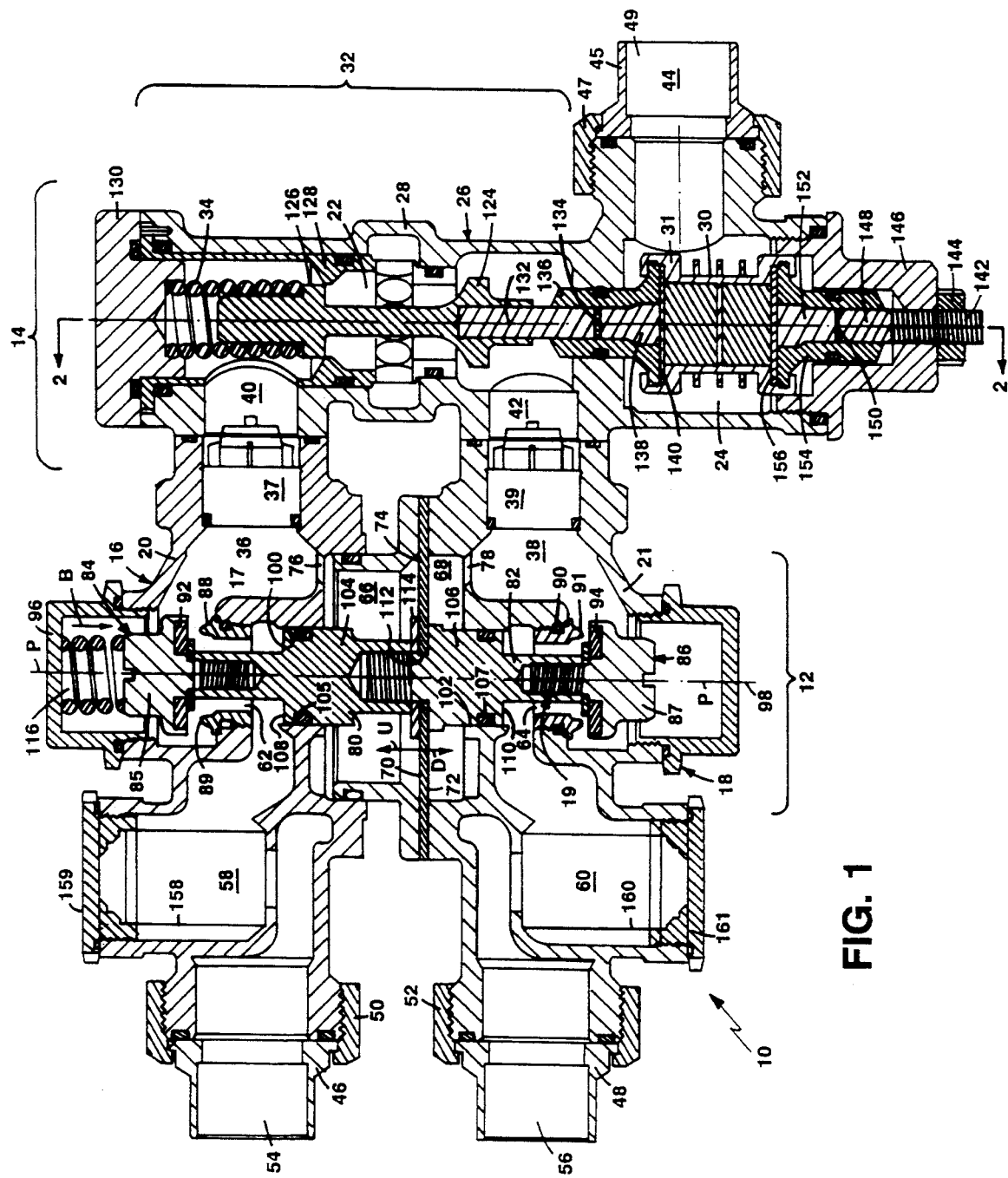
FIG. 1 is a top plan view, taken in section, of an anti-scald valve according to the invention.

Referring now to FIG. 1, an anti-scald valve 10 of the invention generally includes a pressure regulator section 12 and a thermostatic tempering valve section 14.

The pressure regulator section 12 includes a cold water hydraulic pressure reduction valve or pressure regulator 16 for regulation of cold water pressure and a hot water hydraulic pressure reduction valve or pressure regulator 18 for control of hot water hydraulic pressure. Valves 16, 18 are housed in regulator bodies 20, 21, respectively.

Thermostatic tempering valve section 14 defines first and second mixing chambers 22, 24 and a mixing valve assembly 26 housed in a mixing valve body 28. Mixing valve assembly 26 generally includes a dual-element, wax-filled thermostat element 30 housed in a thermostat body 31, a piston assembly 32 and a return spring 34.

Pressure reduction valves 16, 18 act to constantly provide cold and hot water at balanced pressures at outlets 36, 38 of regulator bodies 20, 21, respectively. Check valves 37, 39 are provided at the respective outlets for the purpose of preventing thermal siphoning in the case of loss of supply pressure, and also to prevent pressure on the cold water or hot water side from acting against both sides of the pressure regulator diaphragm 74, as will be described more fully below. The pressure-balanced flows of cold water and hot water flow through the check valves 37, 39, into mixing valve body 28 by way of respective inlets 40, 42, into the thermostatic tempering valve section 14, where the flows are mixed in a ratio that is adjusted in order that a mixed water temperature no higher than a predetermined maximum level is provided at a mixed water outlet 44 of mixing valve body 28.

The regulator bodies 20, 21 are connected to cold water and hot water supplies through fittings 46, 48, which are joined to regulator bodies 20, 21, e.g., by threaded union nuts 50, 52. Fittings 46, 48 define female threaded openings 54, 56 sized for attachment upon ¾-inch size externally threaded cold water and hot supply lines (not shown).

The cold water flows through pressure regulator body 20 by way of passageway 58, extending from inlet 54, through cold water flow orifice 62, through check valve 37 in outlet passageway 36. The body 20 further defines a cold water pressure regulation chamber 66 which is bounded by surface 70 of diaphragm 74, the chamber 66 being connected to cold water outlet passageway 36 by way of aperture 76. In a similar manner, the hot water flows through pressure regulator body 21 by way of passageway 60, extending from inlet 56, through hot water flow orifice 64, and then through check valve 39 in outlet passageway 38. The body 21 further defines a hot water pressure regulation chamber 68 which is bounded by surface 72 of diaphragm 74, the chamber 68 being connected to hot water outlet passageway 38 by way of aperture 78. In this manner, the cold water pressure regulator 16 and hot water pressure regulator 18 are placed in communication across the flexible diaphragm 74 separating chambers 66, 68.

The cold water pressure regulator valve 16 includes a valve assembly 17 and the hot water pressure regulator 18 are includes a valve assembly 19, with the respective valve assemblies 17, 19 connected across the diaphragm 74, the valve assemblies being mounted (within the respective bodies 20, 21) for movement as unit along valve axis, P.

The cold water valve assembly 17 includes valve stem 80, extending through cold water flow orifice 62 defined by body 20, and a valve head element 84 which is joined to the valve stem 80 in threaded engagement. A valve seat element 88 is replaceably secured to the body 20 at the cold water flow orifice 62, and a valve seal 92 is replaceably mounted beneath the head 85 of the valve head element 84, for sealing engagement upon the seat surface 89 of element 88. The threaded relationship of valve elements 80, 84, and the slotted head 85, permits axial adjustment of the position of the cold water valve seal 92. A cap 96 is joined in threaded engagement to the body 20, over the valve head 85. The valve stem 80, in the region where it extends through an aperture 100 in the wall of the body 20, includes a piston element 104 defining a surface 108 of relatively large area (similar in size to the flow orifice 62) exposed to cold water pressure in passageway 58. An o-ring 105 provides a seal between the body 20 and the piston 104.

Again, in similar fashion, the hot water valve assembly 19 includes valve stem 82, extending through hot water flow orifice 64 defined by body 21, and a valve head element 86 which is joined to the valve stem 82 in threaded engagement. A valve seat element 90 is replaceably secured to the body 21 at the hot water flow orifice 64, and a valve seal 94 is replaceably mounted beneath the head 87 of the valve head element 86, for sealing engagement upon the seat surface 91 of element 90. The threaded relationship of valve elements 82, 86, and the slotted head 87, similarly permits axial adjustment of the position of the hot water valve seal 94. A cap 98 is joined in threaded engagement to the body 21, over the valve head 87. The valve stem 82, in the region where it extends through an aperture 102 in the wall of the body 21, includes a piston element 106 defining a surface 110 of relatively large area (similar in size to the flow orifice 64) exposed to hot water pressure in passageway 60. An o-ring 107 provides a seal between the body 21 and the piston 106.

The valve stem 82 of the hot water valve assembly 19 extends though an aperture 112 in diaphragm 74 and into threaded engagement with valve stem 80 of the cold water valve assembly 17, thereby connecting the respective valve assemblies. Washer 114 provides a water-tight seal at the aperture 112.

The unit of the valve assemblies 17, 19 is biased in the direction of arrow, B, by the force of compression spring 116 disposed between cap 96 and cold water valve head 87.

The pressure of the cold water delivered at outlet 36 and the pressure of the hot water delivered at outlet 38 are kept balanced at the lower of the two pressures (e.g., with hot water pressure maintained about equal or up to about 5% greater than cold water pressure) by action of the pressure regulators 16, 18, as will now be described.

Prior to actuation of the valve 10, the biasing force, B, of spring 116 urges the cold water valve assembly 17 toward a position in which the cold water flow orifice 62 is restricted (but, for reasons of safety, not to the point where the cold water orifice 62 is closed), thus positioning the hot water valve assembly 19 with the hot water flow orifice 64 more open and allowing hot water flow to be initiated through the pressure regulator section 12 of the valve 10 first. Application of the biasing force eliminates valve "hunting" or oscillation as would occur if it were sought to maintain an exact balance of pressures between the cold water regulator 16 and the hot water regulator 18.

Once flow is established through both the cold and hot water inlets 54, 56, if hot water supply pressure entering chamber 68 by way of orifice 78 to bear against surface 72 of diaphragm 74 exceeds the combination of the biasing force, B, and the cold water supply pressure entering chamber 66 by way of orifice 76 to bear against surface 70 of diaphragm 74, the hot water pressure acts to deflect the diaphragm 74 upward (arrow U). Upward movement of the diaphragm 74 causes the cold water valve assembly 17, connected to the diaphragm, to move upward as well, thereby increasing the displacement of cold water valve seal 92 from seat surface 89 of valve seat 88, and opening the cold water valve orifice 62 to allow increased flow of cold water therethrough. Conversely, upward movement of the diaphragm 74 also causes the hot water valve assembly 19, connected to the diaphragm 74, to move upward as well, thereby decreasing the displacement of hot water valve seal 94 from seat surface 91 of valve seat 90 and closing the hot water valve orifice 64 to reduce the flow of hot water therethrough.

Similarly, if the combination of the biasing force, B, and the cold water supply pressure bearing against surface 70 of diaphragm 74 in chamber 66 exceeds the hot water supply pressure bearing against surface 72 of diaphragm 74 in chamber 68, the diaphragm is deflected downward (arrow D). This downward movement of the diaphragm 74 causes the cold water valve assembly 17, connected to the diaphragm, to move downward as well, thereby reducing the displacement of cold water valve seal 92 from seat surface 89 of valve seat 88 and reducing the flow of cold water therethrough. This downward movement of the diaphragm 74 also causes the hot water valve assembly 19, connected to the diaphragm, to move downward, thereby increasing the displacement of hot water valve seal 94 from seat surface 91 of valve seat 90 and increasing the flow of hot water therethrough.

As constructed, the unit of valve assemblies 17, 19 does not favor any position, but is set by the combination of the spring biasing force, B, and the relative pressures of the cold water and hot water acting upon the diaphragm 74. Also, in order to further reduce oscillation of the valve assemblies, in particular when flow through the valve approaches a "closed" condition, the valve stems 80, 82 each include pistons 104, 106 defining respective oppositely-directed surfaces 108, 110 of relatively large area. The cold water supply pressure in passageway 58 bears against surface 108 and the hot water supply pressure in passageway 60 bears against surface 110, thus providing an inertial resistance to rapid movement of the valve assemblies 17, 19.

In this manner, the pressure of the cold water at outlet 36 and the pressure of the hot water at outlet 38 are kept balanced at the lower of the two pressures (e.g., with hot water pressure maintained about equal to up to about 5% greater than cold water pressure, due to the force of spring 116).

The pressure-balanced flows of cold water and hot water exiting the pressure regulator section 12 via outlets 36, 38 enter the thermostatic tempering valve section 14 via inlets 40, 42 of mixing valve body 28 and flow into first mixing chamber 22. The respective volumes of cold water and hot water entering the first mixing chamber 22 are also controlled, as will now be described.

Figure 2:
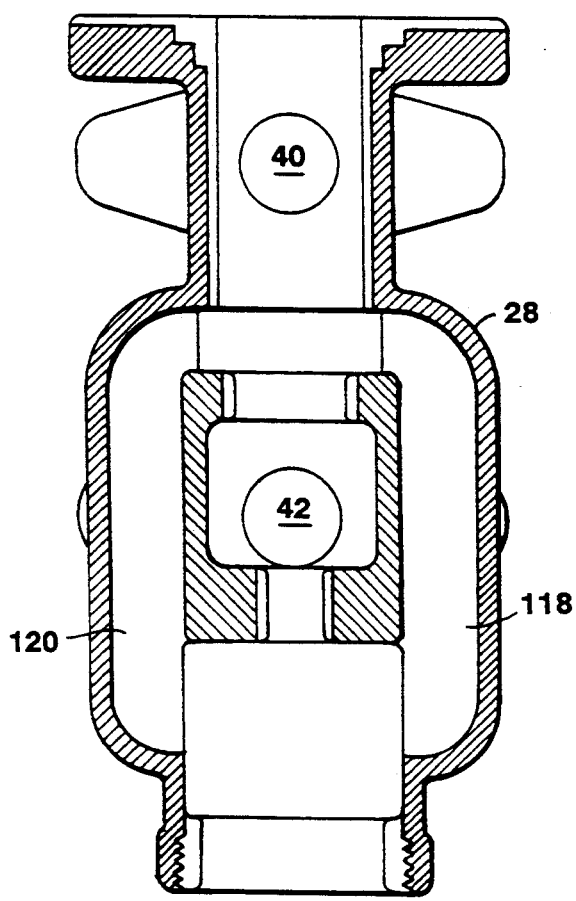
FIG. 2 is a side section of the anti-scald valve of the invention taken at the line 2—2 of FIG. 1.

The respective volumes of cold water and hot water passing through the regulators 16, 18 enter mixing chamber 22 defined by mixing valve body 28. The volume ratio of cold water to hot water entering the first mixing chamber is determined by the position of piston assembly 32, which is controlled and adjusted continuously by the action of thermostat 30. The first mixing chamber 22 is connected by jug handle conduits 118, 120 (FIG. 2), defined by mixing valve body 28, to second mixing chamber 24 within which thermostat 30 is located. The Jug handle conduits 118, 120 promote turbulent flow of the water mixture about thermostat 30 to provide efficient exchange of heat between the thermostat 30 and the water in the surrounding second mixing chamber.

Second mixing chamber 24 is connected to mixed water outlet 44 defined by mixing valve body 28. A threaded fitting 45 is joined to the mixing valve body at outlet 44, e.g., by a threaded union nut 47. Fitting 45 defines a female threaded opening 49 sized to receive a ¾-inch size externally threaded mixed water line (not shown).

Piston assembly 32 includes a plug stem 124 with a seal body portion 126 disposed for engagement with a seat/cage 128 mounted in the mixing valve body 28, the seal body portion 126 being biased towards engagement by return spring 34 (which may be accessed by removal of a top cap 130). Piston assembly 32 further includes a plunger 132 connected to plug stem 124 at a first end and contacting a diaphragm 134 at a second end, the diaphragm 134 and a portion of the second end of the plunger being disposed inside a bonnet 136 mounted to the thermostat body 31.

A buffer element 138, also disposed inside the bonnet 136, is located between an upper diaphragm 140 of the thermostat 30 and diaphragm 134, and acts to transfer movement of upper diaphragm 140 to plunger 132 and thus plug stem 124.

Thermostat 30 is a dual-element, wax-filled actuator. Thermostat body 31 is made of copper. The wax filling, which has a melting point of approximately 104° Fahrenheit (about 40° Celsius), is a mixture of wax with fine copper particles (the copper particles serving to increase thermal conductivity of the mixture) that expands as the temperature increases. Expansion of the wax filling causes upward movement of upper diaphragm 140, which in turn causes upward movement of plunger 132 and plug stem 124. The dual thermostat elements provide redundancy for safety and reliability.

A temperature adjusting mechanism, including a set screw 142 and lock nut 144, allows the user to set a desired mixed water temperature level, typically with the hot water supply at a particular temperature. The set screw 142 extends through a bottom cap 146 threaded into the bottom end of mixing valve body 28. Set screw 142 contacts a plunger. 148, which in turn bears upon a diaphragm 150 and then a buffer 152. Plunger 148, diaphragm 150 and buffer 152 are disposed inside a bonnet 154 mounted to the thermostat body 31. A lower diaphragm 156 separates the buffer 152 from the wax filling of the thermostat 30.

The respective volumes of cold water and hot water allowed into first mixing chamber 22 depend on the position of piston assembly 32 (i.e., plug stem 124). The position of the plug stem can range from one extreme, where mostly cold water is allowed into first mixing chamber 22, to the other extreme, where mostly hot water is allowed into first mixing chamber 22. A tight, metal-to-metal seal between the plug stem and the seat/cage 128 prevents hot water from entering mixing chamber 22 when the plug stem is in the position that only allows cold water into first mixing chamber 22. Similarly, a tight, durable metal-to-metal seal between the seal body portion 126 and the seat/cage prevents cold water from entering mixing chamber 22 when the plug stem is in the position that only allows hot water into first mixing chamber 22.

When the piston assembly 32 (i.e., plug stem 124) is disposed between its two extreme positions, a mix of cold water and hot water is allowed into first mixing chamber 22.

Water in first mixing chamber 22 travels through jug handle conduits 118, 120 (FIG. 2) and enters second mixing chamber 24 where thermostat 30 is located. As previously noted, conduits 118, 120 promote turbulent flow of water in second mixing chamber 24, which results in the efficient exchange of heat from the water to thermostat 30. Efficient heat exchange is necessary to assure an accurate reading by thermostat 30, and thus the proper ratio of cold water and hot water in first mixing chamber 22. Note that thermostat 30 controls the movement of piston assembly 32 and therefore the mix of cold water and hot water that enters first mixing chamber 22.

By way of example, when the temperature of the water in second mixing chamber 24 is above the predetermined level, thermostat 30 expands to cause the piston assembly to move upwardly against the force of return spring 34, thereby moving the plug stem 124 to decrease the volume of hot water permitted to flow into first mixing chamber 22 and increasing the volume of cold water permitted to flow into the chamber. Conversely, when the temperature of the water entering in second mixing chamber 24 is lower than the predetermined level, thermostat 30 contracts to allow the return spring 34 to move the piston assembly 32 in a downwardly direction so that the volume flow rate of hot water permitted to enter the second mixing chamber 24 is increased and the volume flow rate of cold water entering is decreased.

Thus, the action of mixing valve assembly 26 results in delivery of water at outlet 44 that is at the desired temperature. Of course, the mixed water temperature could fall below the desired maximum temperature if the temperature of the hot water supply is below the desired mixed water maximum temperature level.

A supply line for delivery of the mixed water throughout the home or facility (not shown) is then attached to externally screw threaded mixed water outlet 44.

The mixing valve assembly 26 is designed to operate properly with a flow of 2 gallons per minute (about 7.6 liters per minute) or greater. Thus the flow of mixed water from outlet 44 will more than meet existing requirements for minimum flow due to the adequate flow provided by the ¾-inch size cold water and hot water supply lines.

Other embodiments are within the following claims. For example, dual temperature sensitive elements are not necessary for proper operation, and a single element, or more than two elements, may also be employed. Anti-scald valve 10 may also include a "tamper-proof" temperature adjusting mechanism. For example, to provide the tamper-proof feature, a protective housing may be secured over the temperature adjusting mechanism. The protective housing may be affixed to either bottom cap 146, or to mixing valve body 28, in a manner such that it may be removed only by an authorized technician to gain access to the temperature adjusting mechanism.

Strainers 158, 160 (FIG. 1) may also be provided in the paths of the cold and hot water flows, respectively, to prevent potentially harmful particles from entering regulators 16, 18. The strainers are accessed, e.g. for maintenance or repair, by means of threaded caps 159, 161.

Also, for many "point of use" applications within a home or the like, e.g., at a shower or a sink, it may be desireable to permit adjustment (i.e., lowering) of the temperature of the water delivered at the nozzle or faucet from the maximum temperature provided by operation of the anti-scald valve 10. This requires both a hot water supply line (delivered from the anti-scald valve) and a cold water supply line (for tempering the maximum hot water temperature). According to one embodiment of the invention (FIG. 1), the mixed water outlet 44 of anti-scald valve 10 provides the hot water supply and the cold water supply may be obtained by tapping off the cold water inlet line, e.g. feeding to inlet 54. A person at the point of use then operates a manual mixing valve to combine the hot (i.e., mixed) water supply with the cold water supply to achieve a desired water temperature.

In such an arrangement, the cold water supply feeding the point of use may have a decrease or loss in pressure that does not also result in a similar decrease in pressure of the cold water supply attached to fitting 46 of anti-scald valve 10. The anti-scald valve 10 of the invention can only compensate for pressure changes in the supply lines attached to fittings 46 and 48, and this situation may result in higher than desirable temperatures at the point of use (e.g., the shower head or sink faucet), since the hot water delivered to the point of use from the anti-scald valve will remain at approximately the same predetermined maximum temperature, and the flow of cold water, required for adjustment (lowering) of the temperature of the hot water, has decreased or even stopped. (The temperature of the water at the point of use will, of course, never exceed the predetermined maximum level provided at mixed water outlet 44.)

Figure 3:
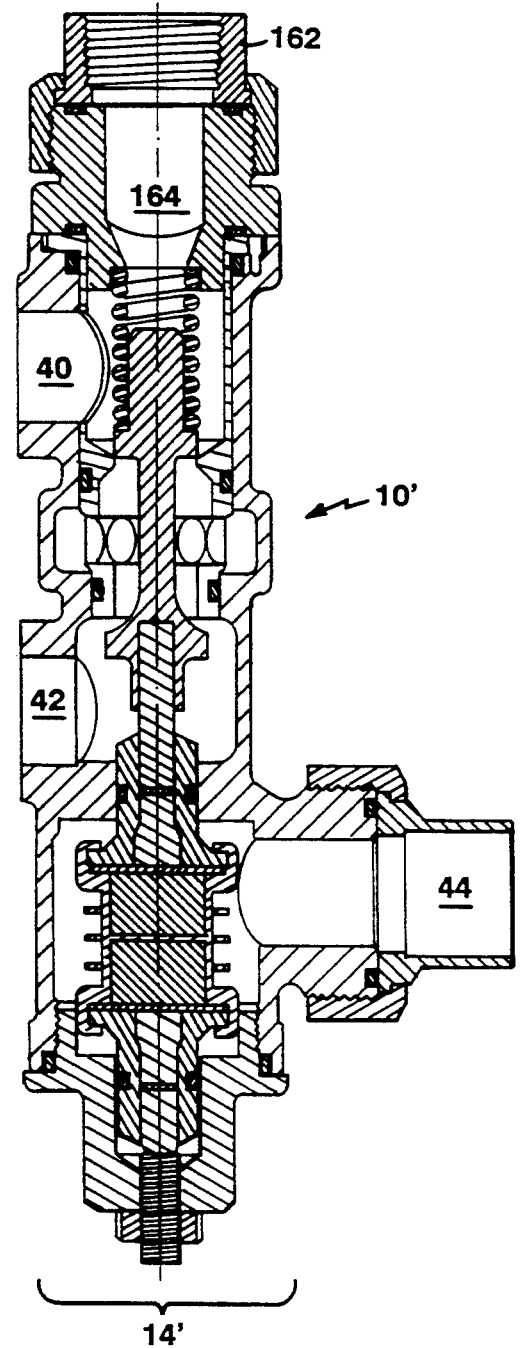
FIG. 3 is a top plan view of the thermostatic tempering valve section of an alternate embodiment of an anti-scald valve of the invention.

Referring to FIG. 3, according to an alternate embodiment of the invention, in order to prevent the temperature of the water at the point of use from exceeding the desired temperature, the thermostatic tempering valve section 14' of an anti-scald valve 10' of the invention includes a cold water outlet fitting 162 defining a cold water outlet 164 (in addition to a mixed water outlet 44). This alternate embodiment is similar to that of FIG. 1, except that the cold water supplied to the point of use, and the cold water supplied to the facility in general (flowing via fitting 162) and the hot water supplied to the point of use and to the facility in general (flowing via outlet 44) are all provided through the anti-scald valve 10'. Thus by means of the alternate embodiment of the anti-scald valve 10' of the invention, any loss of pressure of the cold water supply feeding the point of use will reflect a similar loss of pressure in the cold water line attached to at inlet 54. Therefore, due to the safety features of the anti-scald valve of the invention, flow of the hot (mixed) water to the point of use, without flow of cold water for tempering, will be prevented.

Also, in order to permit the supply water flow to be stopped, e.g., to permit repair or replacement of downstream plumbing elements, including the anti-scald valve, the fittings 46, 48 at the hot and cold water supply inlets may also include ball valves.

What is claimed is:

1. A temperature control flow valve comprising a body, said body defining a first conduit having a cold water inlet adapted for attachment to a source of cold water, a second conduit having a hot water inlet adapted for attachment to a source of hot water, at least a first mixing chamber, said first conduit having a cold water outlet for flow of cold water into said first mixing chamber, and said second conduit having a hot water outlet for flow of hot water into said first mixing chamber, and a mixed water outlet adapted for attachment to a conduit system for delivery of mixed water to one or more points of use;

a cold water pressure regulator adapted to control the pressure of cold water flowing toward said cold water outlet, said cold water pressure regulator comprising a cold water valve element disposed for movement relative to an opposed cold water valve seat in a manner to regulate the flow of cold water through a cold water valve opening;

a hot water pressure regulator adapted to control the pressure of hot water flowing toward said hot water outlet, said hot water pressure regulator comprising a hot water valve element disposed for movement relative to an opposed hot water valve seat in a manner to regulate the flow of hot water through a hot water valve opening;

means for balancing the pressure of hot water flowing toward said hot water outlet with the pressure of cold water flowing toward said cold water outlet, said means for balancing comprising a moveable element disposed in a chamber defined by said body, a first surface of said moveable element in contact with said cold water conduit, and a second, opposite surface of said moveable element in contact with said hot water conduit, means connecting said moveable element with said hot water valve element and with said cold water valve element, and means for biasing said cold water valve element toward said cold water valve seat, said moveable element adapted to move in reaction to variation in a ratio of pressure in said cold water conduit to pressure in said hot water conduit, movement of said moveable element resulting in movement of said hot water valve element relative to said hot water valve seat and in movement of said cold water valve element relative to said cold water valve seat;

a mixing valve assembly comprising a mixing valve element disposed in said first mixing chamber, said mixing valve element adapted for movement within said first mixing chamber in a manner to adjust the ratio of hot water and cold water flowing into said first mixing chamber; and a thermostat element connected with said mixing valve element, said thermostat element adapted to react to change of temperature of the mixed water in a manner to adjust the position of said mixing valve element in said first mixing chamber, thereby to maintain the temperature of mixed water below a predetermined maximum temperature.

2. The temperature control flow valve of claim 1 wherein said body further defines a second mixing chamber and at least a third conduit connecting said first mixing chamber and said second mixing chamber, said outlet being connected to said second mixing chamber and said thermostat element being disposed in said second mixing chamber.

3. The temperature control flow valve of claim 2 wherein said body defines one or more additional conduits also connecting said first mixing chamber and said second mixing chamber.

4. The temperature control flow valve of claim 1 wherein said body further defines a further cold water outlet adapted for attachment to a conduit system for delivery of cold water to one ore more points of use.

5. The temperature control flow valve of claim 1 wherein said moveable element comprises a diaphragm.

6. The temperature control flow valve of claim 1 wherein said mixing valve assembly further comprises
a first mixing valve seat, and
a second mixing valve seat, and
said mixing valve element disposed in said first mixing chamber comprises a first mixing valve member opposed to and disposed for engagement upon said first mixing valve seat and a second mixing valve member opposed to and disposed for engagement upon said second mixing valve seat, and
said first mixing valve member and the opposed first mixing valve seat together defining a cold water flow orifice and said second mixing valve member and the opposed second mixing valve seat defining a hot water flow orifice.

7. The temperature control flow valve of claim 1 wherein said thermostat element comprises at least one cell containing a material adapted to change volume in reaction to change of temperature.

8. The temperature control flow valve of claim 7 wherein said material comprises wax containing heat-conducting particles.

9. The temperature control flow valve of claim 7 wherein said thermostat element comprises a redundancy of said cells.

10. The temperature control flow valve of claim 1 wherein said cold water valve element further comprises a cold water piston element defining a surface exposed to cold water supply pressure acting in a first direction, and said hot water valve element further comprises a hot water piston element defining a surface exposed to hot water supply pressure acting in a second direction generally opposed to said first direction.

11. The temperature control flow valve of claim 1 further comprising check valve means disposed in at least the cold water outlet.

12. The temperature control flow valve of claim 1 or 11 further comprising check valve means disposed in the hot water outlet.

13. The temperature control flow valve of claim 1 wherein a pressure surface is disposed on said cold water valve element to prevent oscillation of said moveable element.

14. The temperature control flow valve of claim 2 wherein a pressure surface is disposed on said hot water valve element to prevent oscillation of said moveable element.

15. A pressure control flow valve comprising a body, said body defining a first conduit having a cold water inlet adapted for attachment to a source of cold water and a cold water outlet, a second conduit having a hot water inlet adapted for attachment to a source of hot water and a hot water outlet;

a cold water pressure regulator adapted to control the pressure of cold water flowing toward said cold water outlet, said cold water pressure regulator comprising a cold water valve element disposed for movement relative to an opposed cold water valve seat in a manner to regulate the flow of cold water through a cold water valve opening;

a hot water pressure regulator adapted to control the pressure of hot water flowing toward said hot water outlet, said hot water pressure regulator comprising a hot water valve element disposed for movement relative to an opposed hot water valve seat in a manner to regulate the flow of hot water through a hot water valve opening; and means for balancing the pressure of hot water flowing toward said hot water outlet with the pressure of cold water flowing toward said cold water outlet, said means for balancing comprising a moveable element disposed in a chamber defined by said body, a first surface of said moveable element in contact with said cold water conduit, and a second, opposite surface of said moveable element in contact with said hot water conduit, means connecting said moveable element with said hot water valve element and with said cold water valve element, and means for biasing said cold water valve element toward said cold water valve seat, said moveable element adapted to move in reaction to variation in a ratio of pressure in said cold water conduit to pressure in said hot water conduit, movement of said moveable element resulting in movement of said hot water valve element relative to said hot water valve seat and in movement of said cold water valve element relative to said cold water valve seat;

whereby the pressure of cold water delivered at said cold water outlet and the pressure of hot water delivered at said hot water outlet are substantially balanced.

16. The pressure control flow valve of claim 15 wherein said moveable element comprises a diaphragm.

17. The pressure control flow valve of claim 15 wherein said cold water valve element further comprises a cold water piston element defining a surface exposed to cold water supply pressure acting in a first direction, and said hot water valve element further comprises a hot water piston element defining a surface exposed to hot water supply pressure acting in a second direction generally opposed to said first direction.

18. The pressure control flow valve of claim 15 further comprising check valve means disposed in at least the cold water outlet.

19. The pressure control flow valve of claim 15 or 18 further comprising check valve means disposed in the hot water outlet.

20. The pressure control flow valve of claim 15 wherein a pressure surface is disposed on said cold water valve element to prevent oscillation of said moveable element.

21. The pressure control flow valve of claim 15 wherein a pressure surface is disposed on said hot water valve element to prevent oscillation of said moveable element.

* * * * *

UNITED STATES PATENT AND TRADEMARK OFFICE
CERTIFICATE OF CORRECTION

PATENT NO. : 5,341,987
DATED : August 30, 1994
INVENTOR(S) : Rand H. Ackroyd

It is certified that error appears in the above-indentified patent and that said Letters Patent is hereby corrected as shown below:

Col. 7, line 16, "Jug" should be --jug--.

Col. 11, claim 4, line 18, "ore" should be --or--.

Signed and Sealed this

Sixteenth Day of January, 1996

Attest:

BRUCE LEHMAN

*Attesting Officer*  *Commissioner of Patents and Trademarks*